US008346951B2

(12) United States Patent
Hayes (10) Patent No.: US 8,346,951 B2
(45) Date of Patent: Jan. 1, 2013

(54) METHOD FOR FIRST PACKET AUTHENTICATION

(75) Inventor: John W. Hayes, Reno, NV (US)

(73) Assignee: BlackRidge Technology Holdings, Inc., Reno, NV (US)

( * ) Notice: Subject to any disclaimer, the term of this patent is extended or adjusted under 35 U.S.C. 154(b) by 1634 days.

(21) Appl. No.: 11/242,637

(22) Filed: Sep. 30, 2005

(65) Prior Publication Data

US 2006/0089994 A1   Apr. 27, 2006

Related U.S. Application Data

(63) Continuation-in-part of application No. 10/094,425, filed on Mar. 5, 2002, now Pat. No. 6,973,496.

(51) Int. Cl.
 *G06F 15/16* (2006.01)
 *G06F 15/173* (2006.01)

(52) U.S. Cl. .............................. 709/229; 709/225; 726/4

(58) Field of Classification Search .......... 709/223–237; 726/2–21
See application file for complete search history.

(56) References Cited

U.S. PATENT DOCUMENTS

| | | | | |
|---|---|---|---|---|
| 2001/0042200 A1* | 11/2001 | Lamberton et al. | ........... | 713/151 |
| 2002/0124169 A1* | 9/2002 | Agrawal et al. | ............... | 713/168 |
| 2002/0198981 A1* | 12/2002 | Corl et al. | ..................... | 709/224 |
| 2003/0035370 A1* | 2/2003 | Brustoloni | .................... | 370/229 |
| 2003/0110274 A1* | 6/2003 | Pazi et al. | ..................... | 709/229 |
| 2003/0126272 A1* | 7/2003 | Corl et al. | ..................... | 709/230 |

OTHER PUBLICATIONS

RFC793 ("Transmission Control Protocol", Information Sciences Institute University of Southern California, Sep. 1981, www.netfor2.com/rfc793.txt).*

\* cited by examiner

*Primary Examiner* — Ian N Moore
*Assistant Examiner* — Afshawn Towfighi
(74) *Attorney, Agent, or Firm* — Thomas N. Giaccherini

(57) ABSTRACT

In a preferred embodiment of the invention, a network client (42) inserts an authorization key (38) into the SEQ (30) and ACK (32) fields of a TCP connection request (56). The TCP connection request (56) is sent to a authorizing server (46). The authorizing server (46) extracts the authorization key (38) and uses the authorization key (38), with other implicit and explicit data contained within the TCP connection request (56) to authorize the TCP connection request (56). If the TCP connection request (56) is authorized, the authorizing server (46) sends a TCP-SYN/ACK (58) back to the network client (42) as described in the TCP protocol specification. If the TCP connection request (56) is denied, the TCP connection request (56) is discarded and nothing is sent back to the network client (42).

25 Claims, 10 Drawing Sheets

IP header

TCP/IP Packet

TCP Connection Establishment Transaction

METHOD FOR FIRST PACKET AUTHENTICATION

CROSS-REFERENCE TO A RELATED U.S. PATENT APPLICATION & CLAIM FOR PRIORITY

The Present Patent application is a Continuation-in-Part Application, and is related to a Parent Application U.S. Ser. No. 10/094,425 filed on 5 Mar. 2002 now U.S. Pat. No 6,973, 496. In accordance with the provisions of Sections 119 & 120 of Title 35 of the United States Code of Laws, the Applicant hereby claims the benefit of priority for any and all subject matter that is commonly disclosed in U.S. Ser. No. 10/094, 425 and in the Present Application.

FEDERALLY SPONSORED RESEARCH OR DEVELOPMENT

None.

FIELD OF THE INVENTION

The present invention pertains to methods for concealing the existence of a device connected to a computer network or concealing the existence of certain applications running on a device connected to a computer network. Many computer security attacks are prefaced by a series of probes designed to detect what are the network ports and addresses of the devices that are connected to a computer network. If a device connected to a computer network is concealed in such a way that the device cannot be detected by a network scan, an unauthorized user or other similar applications, then the presence of the network connected device cannot be learned by probing the computer network. This loss of the ability to gain information by probing a computer network should lead to increased security of computer networks. The present invention is envisioned to work in conjunction with firewalls and other computer network and security equipment. Specifically, most networking equipment has interfaces or ports for data and interfaces or pots for management. In some equipment, the same ports are used for both data and management. Management ports allow an administrator to configure the device and to define and implement policies that determine which devices and applications are granted access to the device. The administrator may also have the capability to prioritize one form for data traffic over another. Essentially, the administrator has complete control over the functioning and the behavior of the device. Because of this control, it is very important that administrator access to the device through the management port be carefully controlled. Most devices today require a password, among other things before the administrator is allowed to configure the device. The password is the authenticating mechanism. To enable the password as the authenticating mechanism, the administrator must first establish a connection to the device. The establishment of this connection is granted to anyone who attempts to connect to the management port. The additional requirement of requiring authorization before a connection is granted increases the security of the device.

BACKGROUND OF THE INVENTION

Since the advent of the ARPANET and then the Internet, more and more computers and other devices have been connected to a TCP/IP based network. TCP/IP is a set of protocols. In the field of telecommunications, a protocol is the set of standard rules for data representation, signalling, authentication, error detection and other features required to send information over a communications channel. Not all protocols provide all of these features. Protocols with different features may be layered on top of one another to provide a more robust feature set. Examples of individual protocols are the IP protocol and the TCP protocol. These protocols are often used together and referred to as the TCP/IP protocol.

The fundamental unit of information carried in a TCP/IP network is the packet. A packet consists of a header and a user data area. A good analogy is to consider a packet to be like a letter; the header is like the envelope, and the user data area is whatever the person puts inside the envelope. The IP portion of TCP/IP is the Internet Protocol. IP protocol information is carried by an IP header in an IP packet. The IP header is logically partitioned into a number of fields. The fields of the IP header contain network device address information, IP protocol control information and user data information. The TCP portion of TCP/IP is the Transmission Control Protocol. Using TCP, networked devices can create connections to one another, over which they can send data. The TCP protocol guarantees that data sent by one endpoint will be received in the same order by the other, and without any pieces missing. The TCP protocol also distinguishes data for different applications (such as a Web server and an email server) on the same device. TCP protocol information is carried by an TCP header. The TCP header is partitioned into a number of fields. The fields of the TCP header may contain application information, TCP protocol control information and user data information. Also contained within many TCP/IP packets is user data. User data is the area of a packet that contains the information from the user or device that is being communicated between the devices. Examples of user data are part of all of an email message, part or all of a web page or other applications. Some protocols do not allow user data during certain phases of the protocol. User data is not allowed during connection establishment of the TCP protocol.

As the Internet has grown, so have the attacks of hackers and others who try to disrupt the network through denial of service (DOS) and distributed denial of service (DDOS) attacks, or who attempt to gain unauthorized access to computers and devices.

The first Internet attached devices conformed to the original TCP/IP protocol specifications. When a TCP connection request (otherwise known as a TCP-SYN) was received on a TCP port that no application was listening to, the receiving device sent a connection reject message back to the TCP connection initiator. Hackers quickly learned that they could build port scanners that would scan the entire range of ports on an IP address and learn from the list of successful connection attempts and rejected attempts, what applications were running on the device having the scanned IP address. Over time, network device profile databases were developed that could determine the underlying operating system, vendor and patch level based upon the responses from scanned device.

To combat this, many computer and Internet device vendors changed the behavior of network connected machines that receive connection requests on TCP ports that do not have an associated listening application. The new behavior discards the TCP connection request, without sending a connection reject message to the connection request originator. This behavior is known as "black-holing." This behavior helps because instead of getting a distinct positive or negative acknowledgment, the scanning device must decide how long to wait before timing out the connection request. Because the scanner must also take into account network congestion and other network delays, this timeout is usually on the order of seconds. Timing out each request takes more time and causes the scans to take much longer. Although this does prevent a scanning device from learning what is not there, the scanning device will still receive a positive acknowledgment in the form of a connection establishment response for those TCP ports that have an associated application.

There are mechanisms that can authorize incoming TCP connection requests based on the initiator's IP address. This approach fails in two ways; first it does not work with dynamically allocated IP addresses, such as those that are used in most dial up modem pools, because all of the IP addresses in the pool must be considered valid addresses for this to work. This approach also fails when the initiator lies behind a network address translation (NAT) device, because this changes the initiator's IP address.

None of the above solutions provides a mechanism to authorize the initiator solely on the received TCP connection request without relying on the initiator's IP address. The development of such a mechanism would constitute a major technological advance, and would satisfy long felt needs and aspirations in the computer networking and Internet industries.

SUMMARY OF THE INVENTION

The present invention provides a mechanism to camouflage a network connected device from being detected on the network in much the same way that piece of artwork hung on a wall can camouflage a safe or compartment behind it. Camouflage works by allowing something to be hidden or by blending in with its surroundings. If a camouflaged object moves, or the object it is hiding behind moves, the camouflaged object may reveal itself. If the artwork is moved, it reveals a camouflaged or concealed safe. Once the presence of the safe is revealed, the combination of the safe may be worked to gain access to its contents. A network connected device reveals itself on the network by responding to requests. If it is desired to have the network connected device conceal itself until a authorized request is received, then a mechanism to authorize a received request is required.

The present invention enables a network connected device to authorize a received TCP connection request without relying solely on a initiator's IP address. If the authorization is successful, then the connection establishment process is continued. If the authorization fails, the request is "black-holed," even though there is an application associated with the TCP port in the connection request.

The authorization mechanism uses a combination of various fields in the IP and TCP headers in the TCP connection request. All of these fields have a primary function that is defined in the IP and TCP specifications. The use of existing fields to pass a authorization key is necessary because the TCP protocol specification does not provide a mechanism to pass user data on a TCP connection request. A mechanism to pass user data on a connection request exists for the ISO TP4 protocol.

The goal of this present invention is to enable an authorization mechanism that functions using only the fields in the IP and TCP headers that are normally present in the TCP connection establishment request. This mechanism must not define any new or additional fields and must preserve the functionality of the fields already present. Specifically, the authorization mechanism must encode itself within the fields that are already present without affecting their function. This mechanism must also not require the use of any optional fields that may not be supported by all networking equipment.

Within the IP and TCP headers there are fields that have strictly defined meanings that do not allow any additional encoding because this would alter the functionality of the IP and/or TCP protocols. Examples of such fields are the Source Address, Destination Address, Checksum, Source Port and Destination Port fields.

Within the TCP header, on a connection request (TCP-SYN), the Sequence Number (SEQ) field specifies the starting sequence number for which subsequent data octets are numbered. Additional TCP specifications recommend that this number be randomly generated. This field is 32 bits long. Also within the TCP header is the Acknowledgment Number (ACK) field. This field is not used on a TCP-SYN. This field is 32 bits long and is adjacent to the SEQ field. This gives us 64 bits of data to use as a authorizing key. A smaller key of less than 64 bits may be used if desired. It is also be possible to increase the size of the authorization key over 64 bits by using the TCP window field, the TCP urgent pointer field or other TCP fields that do not effect the connection setup procedure.

The initiator generates an authorization key. The initiator then sends a TCP connection request, inserting an authorization key in the SEQ and ACK fields, to the desired network connected device. The receiving device, upon receiving the connection request, extracts the authorization key. The receiving device then processes the authorization key to determine if the TCP connection request is authorized. During the act of processing the authorization key, the receiving device may also use the initiator's IP address, the time of day or date that the request was received, the physical port the request was received on, or any other information, implicitly or explicitly carried with the TCP connection request to determine the validity of the connection request. If the connection request, the extracted authorization key and all connection establishment granting criteria are met, then the receiving network device authorizes the request and continues the connection establishment transaction by sending a TCP-SYN/ACK in accordance to the TCP protocol specification. If the connection request, the extracted authorization key and all additional connection establishment authorization criteria are not met, then the receiving network device discards the request and nothing is sent to the connection initiator.

An appreciation of the other aims and objectives of the present invention and a more complete and comprehensive understanding of this invention may be obtained by studying the following description of a preferred embodiment, and by referring to the accompanying drawings.

A DETAILED DESCRIPTION OF PREFERRED & ALTERNATIVE EMBODIMENTS

I. Overview of the Invention

The present invention provides methods for concealing the existence of a device connected to a computer network or concealing the existence of certain applications running on a device connected to a computer network. This concealment works by authorizing a TCP connection request using an authorization key embedded within the TCP connection request.

In one preferred embodiment of the invention, the authorization is performed by the receiving host server.

In another preferred embodiment, the authorization is performed by an intervening network device. This device may be a network firewall, a virtual private network (VPN) device, a router, a switch, a cache, a TCP proxy, a virus scanner, an intrusion detection system, an intrusion prevention system or any other device logically or physically placed between the client and the server.

In a preferred embodiment, the authorization key is inserted by the network device requesting the TCP connection.

In another preferred embodiment, the authorization key is inserted by an intervening network device. This device may be a network firewall, a virtual private network (VPN) device, a router, a switch, a cache, a TCP proxy, a virus scanner, an intrusion detection system, an intrusion prevention system or any other device logically or physically placed between the client and the server.

II. Definition of Terms

Network—A network is a collection of computers, servers, clients, routers and devices that are connected together such that they can communicate with each other. The Internet is an example of a network.

Device—A device is any object that is capable of being attached to a network. Examples of devices include computers, servers, clients, laptops, PDAs, cell phones, routers, load balancers, caches, intrusion detection systems, intrusion prevention systems, and firewalls.

Protocol—In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Packet—A packet is the fundamental unit of information carried in modern computer networks. Networks that use packets are called packet switched networks. A packet consists of a header and a user data area. A good analogy is to consider a packet to be like a letter; the header is like the envelope, and the user data area is whatever the person puts inside the envelope. An example of a packet is an IP packet.

IP—IP is the Internet Protocol. The Internet Protocol is a data oriented protocol used by devices to communicated across a packet switched network. IP information is carried by an IP header in an IP packet. The IP header contains device address information, protocol control information and user data information.

TCP—TCP is the Transmission Control Protocol. Using TCP, networked devices can create connections to one another, over which they can send data. The TCP protocol guarantees that data sent by one endpoint will be received in the same order by the other, and without any pieces missing. The TCP protocol also distinguishes data for different applications (such as a Web server and an email server) on the same device.

Field—In computer science, data that has several parts can be divided into fields. For example, a computer may represent today's date as three distinct fields: the day, the month, the year. The IP and TCP headers are each divided into fields. Examples of these fields include the IP source address field and the TCP destination port field.

User Data—User data is the area of a packet that contains the information of the user or device which caused the creation of the packet. Some protocols do not allow user data during certain phases of the protocol. User data is not allowed during connection establishment of the TCP protocol.

Connection—A logical pairing of two devices that enable them to communicate. A connection utilizes a series of packets to accomplish this. A TCP connection is an example of a connection.

Connection Request—A request by one device to another device to create a connection.

Key—A piece of information, usually kept secret, used to pass authentication data from one device to another. A key is sent to aid in proving the identity of the sending device. The key may be used with additional data to authenticate the sending device. Examples of keys include passwords, encrypted passwords, an encoded bitstream and sequences of letters and numbers.

Extracted Authorization Key—The key extracted from one or more fields in the IP and TCP headers of a packet that provide the authorization data of a TCP connection request.

Associated Data—Associated data is information that is related to the authorization key and is also related to the packet from which the authorization key was extracted. Examples of associated data include the source and destination IP addresses, the time the connection request was received and the physical port upon which the connection request was received.

Successful Authorization—Successful authorization occurs when the connection request, the extracted authorization key and other associated data are used to meet the connection establishment granting criteria.

Authorized User—An authorized user is a device, application or person which has been successfully authorized.

Unauthorized User—An unauthorized user is a device, application or person which has not been successfully authorized.

III. Preferred and Alternative Embodiments

Figure 1:
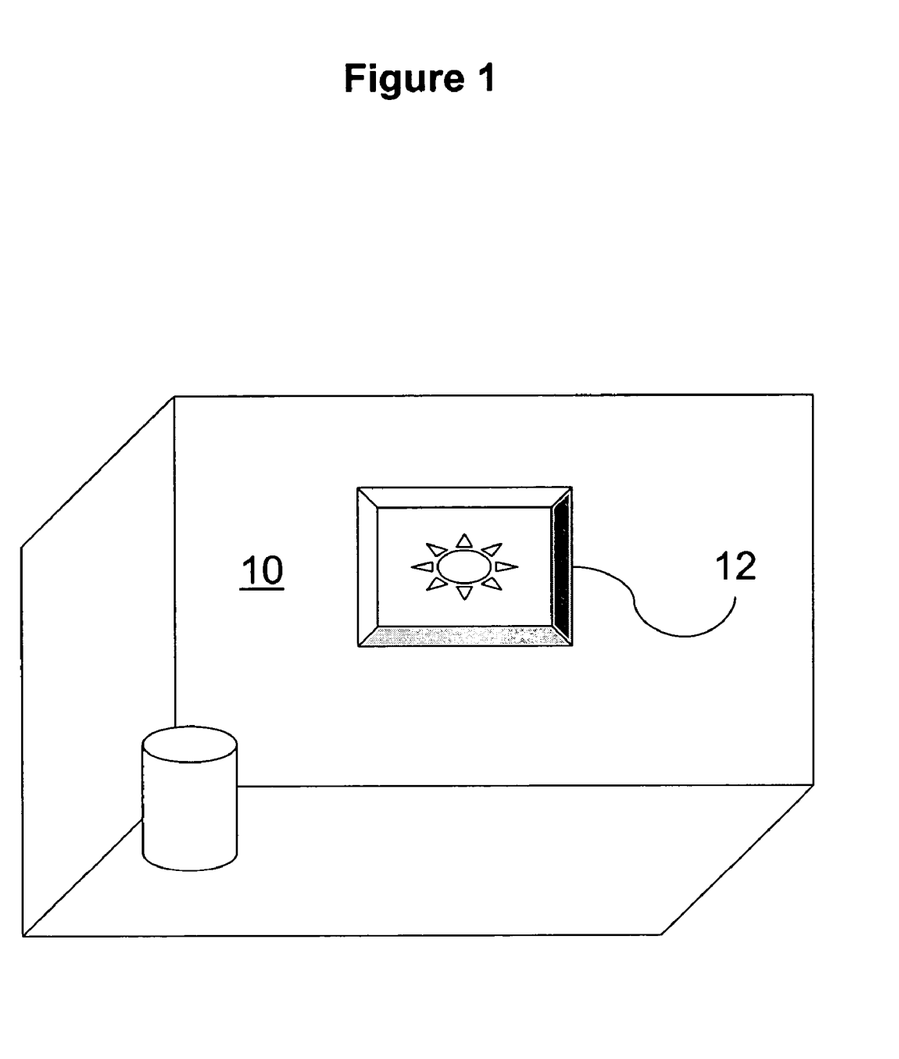
FIG. 1 is an illustration showing a room with a piece of artwork hanging on the wall.

FIG. 1 is an illustration showing a room 10 with a piece of artwork 12 hanging on the wall.

Figure 2:
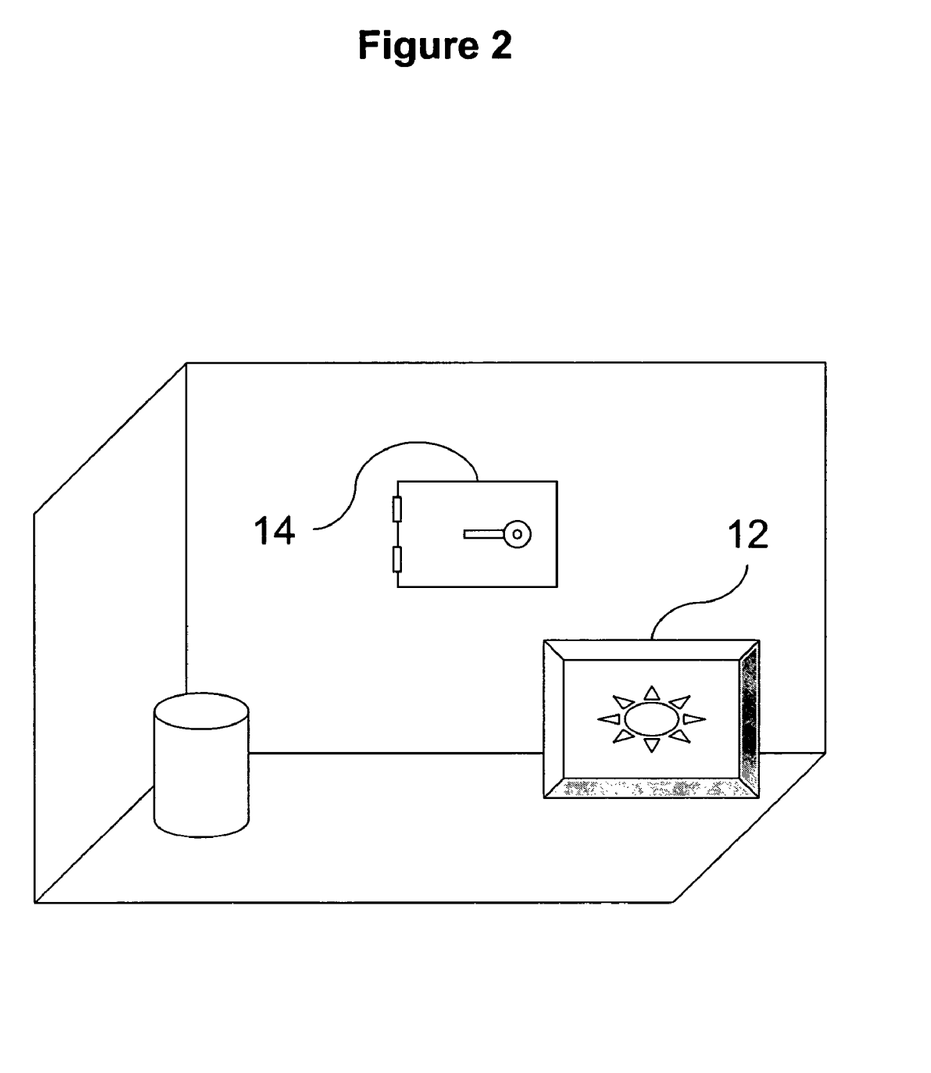
FIG. 2 is an illustration showing a room with a piece of artwork leaning against a wall.

FIG. 2 is an illustration showing a room 10 with a piece of artwork 12 leaning against a wall. The artwork was previously concealing a safe 14.

Figure 3:
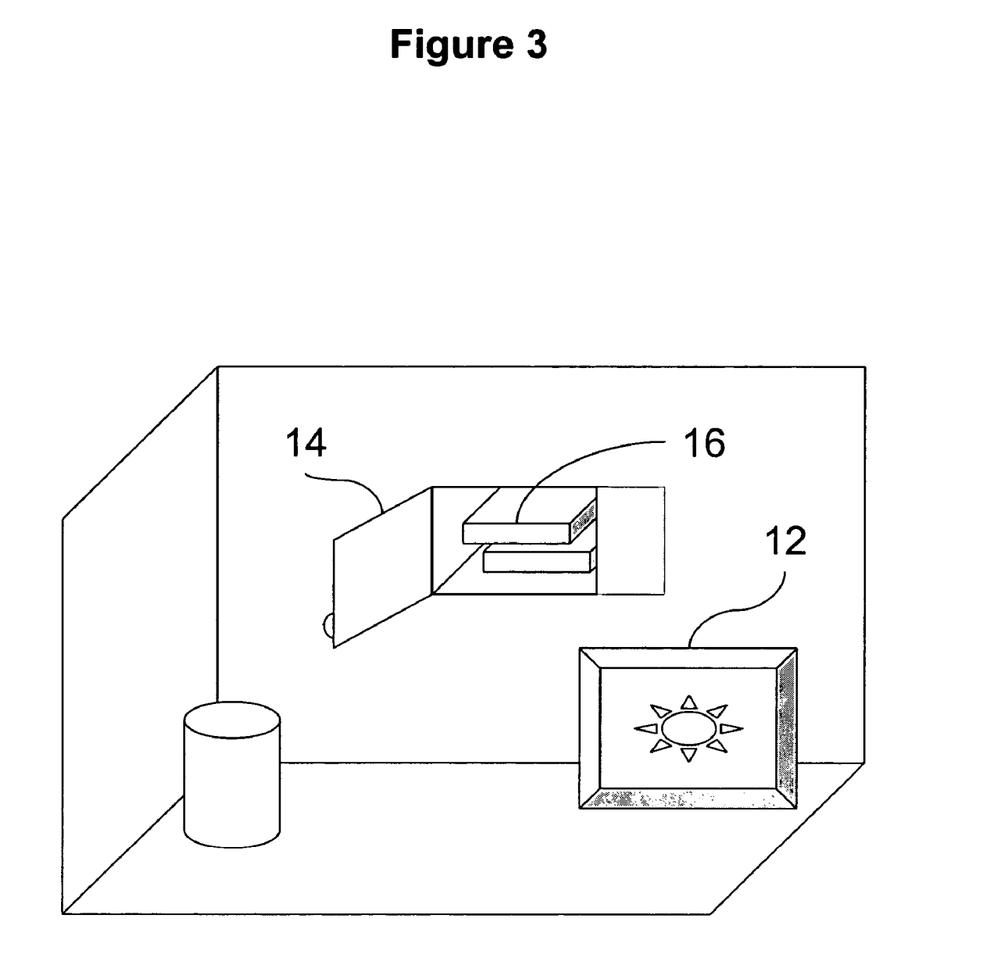
FIG. 3 is an illustration showing a room with a piece of artwork leaning against a wall. The artwork was previously concealing a safe. The safe is open and is displaying the contents.

FIG. 3 is an illustration showing a room 10 with a piece of artwork 12 leaning against a wall. The artwork was previously concealing a safe 14. The safe 14 is open and is displaying the contents 16.

Figure 4:
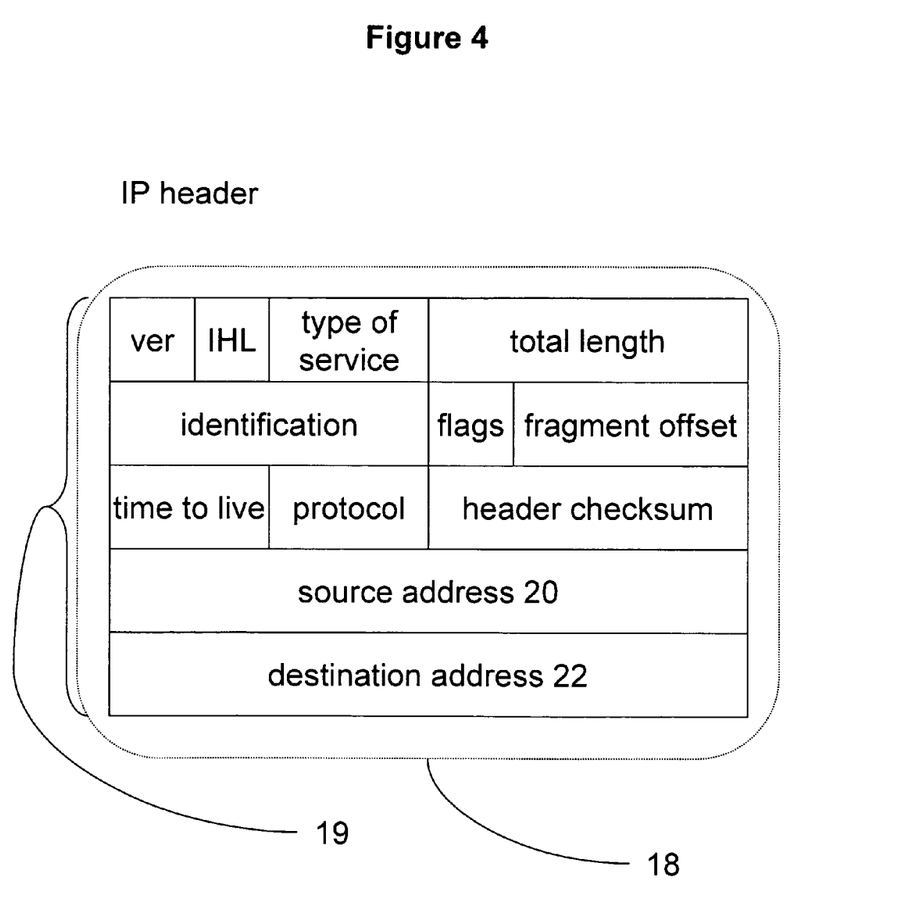
FIG. 4 is an illustration which shows Internet Protocol (IP) header.

FIG. 4 is an illustration which shows Internet Protocol (IP) header 18. The IP header 18 is composed of a number of fields 19 including the IP ver field, the IP IHL field, the IP type of service field, the IP total length field, the IP identification field, the IP flags field, the IP fragment offset field, the IP time to live field, the IP protocol field, the IP header checksum field, the IP source address field 20 and the IP destination address field 22 and other optional fields. A field 19 is a piece of data. In computer science, data that has several parts can be divided into fields.

Figure 5:
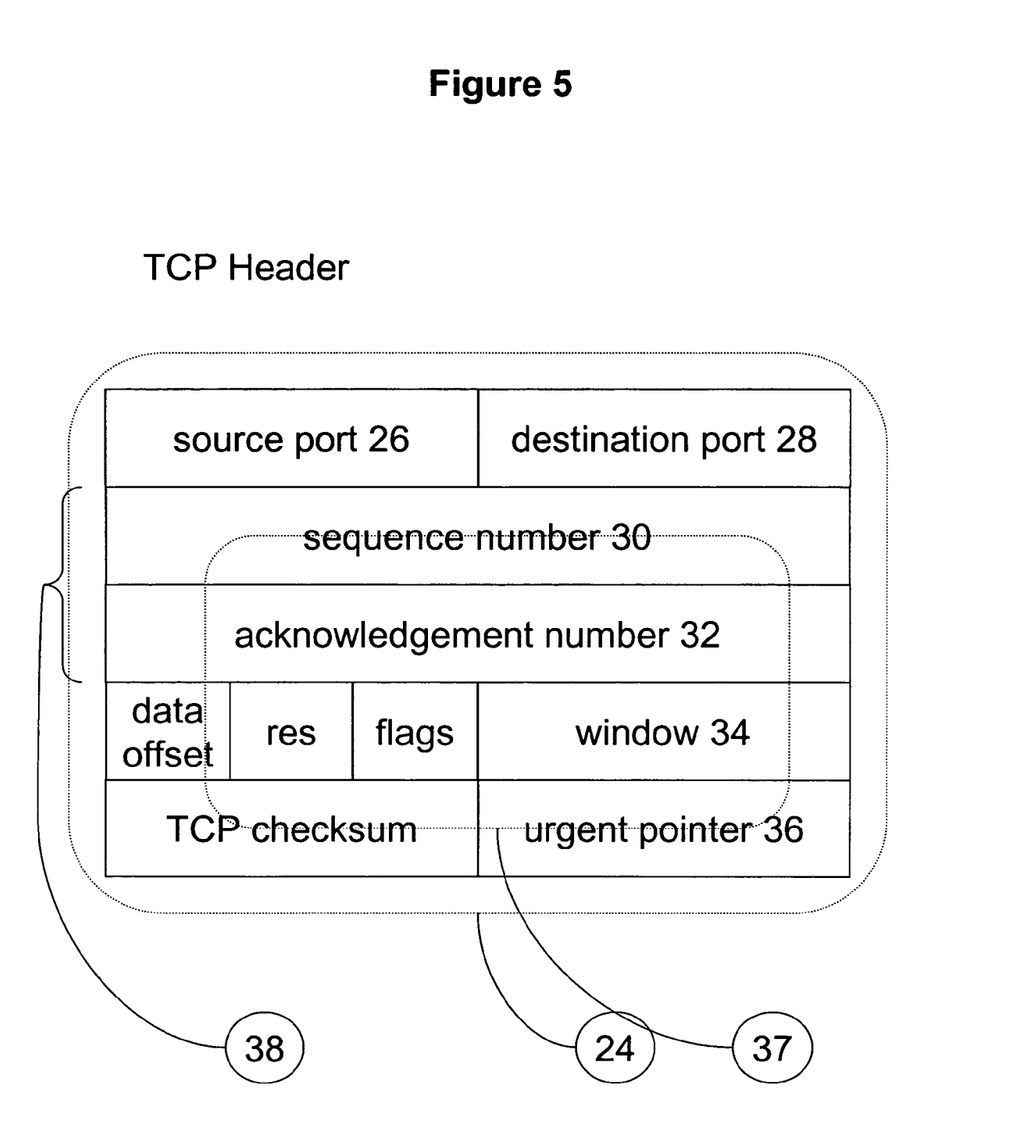
FIG. 5 is an illustration which shows the Transmission Control Protocol (TCP) header.

FIG. 5 is an illustration which shows the Transmission Control Protocol (TCP) header 24. The TCP header 24 is composed of a number of fields 19 including the TCP source port field 26, the TCP destination port field 28, the TCP sequence number field 30, the TCP acknowledgment field 32, the TCP data offset field, the TCP res field, TCP flags field, the TCP window field 34, the TCP checksum field, and the TCP urgent pointer field 36 among other fields. Also shown is the TCP sequence number field 30 and the TCP acknowledgment field 32 grouped together to form an authorization key 38. A field 19 is a piece of data. In computer science, data that has several parts can be divided into fields.

Figure 6:
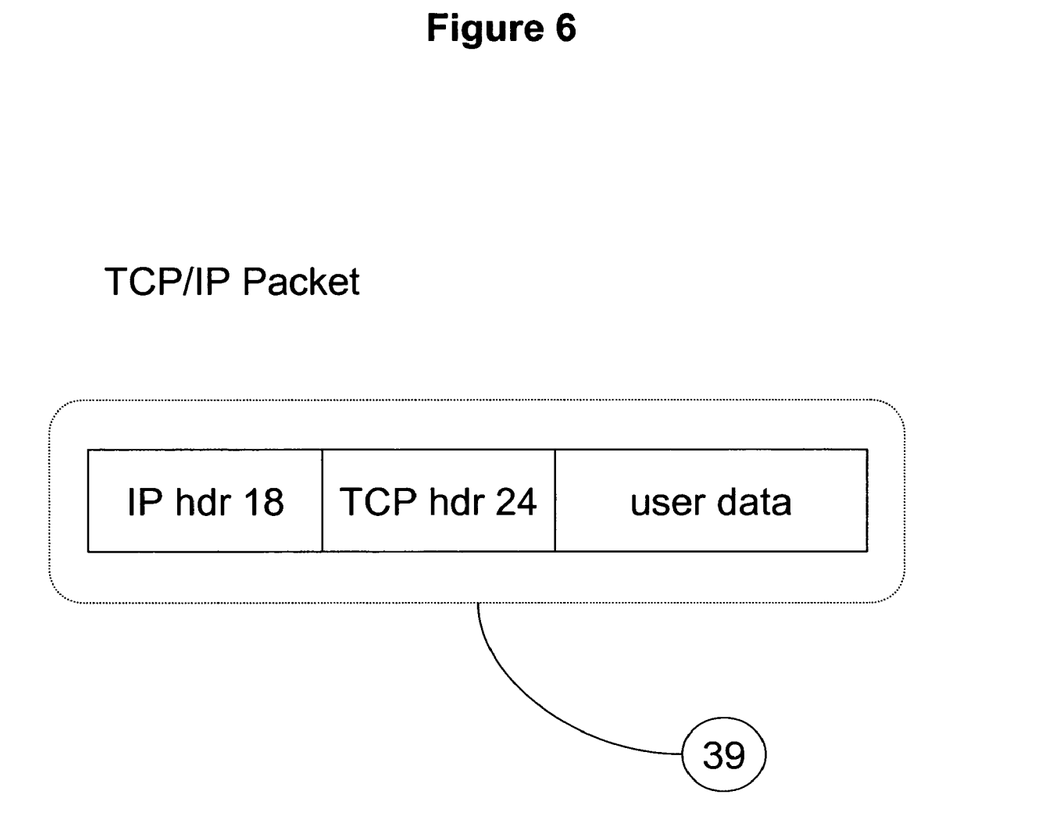
FIG. 6 is an illustration which shows a TCP/IP packet.

FIG. 6 is an illustration which shows a TCP/IP packet 39. The TCP/IP packet 39 is composed of an IP header 18, followed by a TCP header 24 which is optionally followed by user data.

Figure 7:
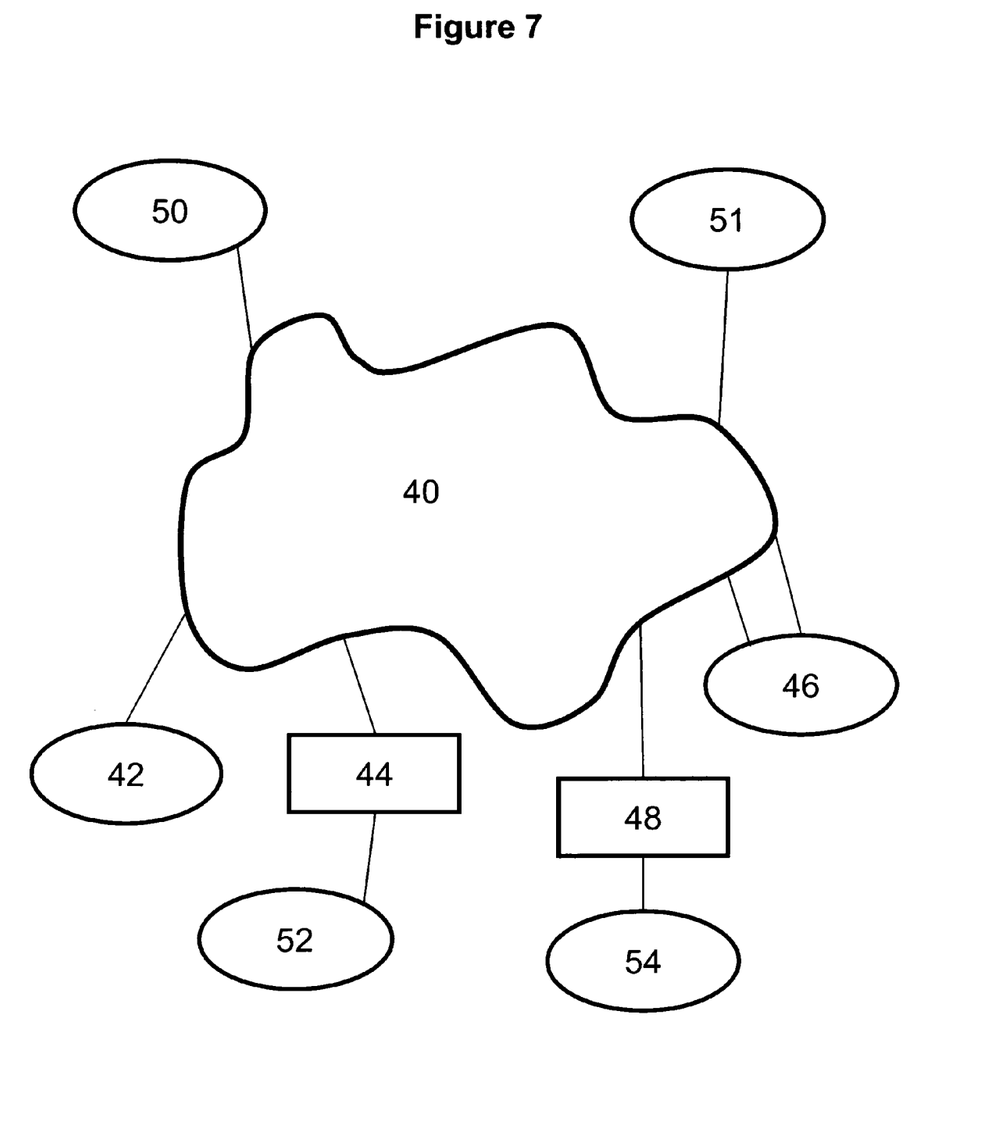
FIG. 7 is an illustration which shows a network and attached devices.

FIG. 7 is an illustration which shows a network 40. Connected to the network 40 is client 42, a client side intermediate device 44, a server 46, a server side intermediate device 48, an unauthorized client 50 and a server that does not perform authorization 51. Connected to the client side intermediate device 44 is client 52. Connected to server side intermediate device 48 is server 54. The client side intermediate device 44 has two network ports, one connected to the network 40 and the other connected to a client 52. The client side intermediate device 44 may have additional ports connected to either the network 40, additional clients 52 or other intermediate network devices 44, 48. The server side intermediate device 48 has two network ports, one connected to the network 40 and the other connected to a server 54. The server side intermediate device 48 may have additional ports connected to either the network 40, additional servers 52 or other intermediate network devices 44, 48. The server 46 has two network ports, both connected to the network 40. The server 46 may have additional ports connected to either the network 40, additional servers 52 or other intermediate network devices 44, 48.

Figure 8:
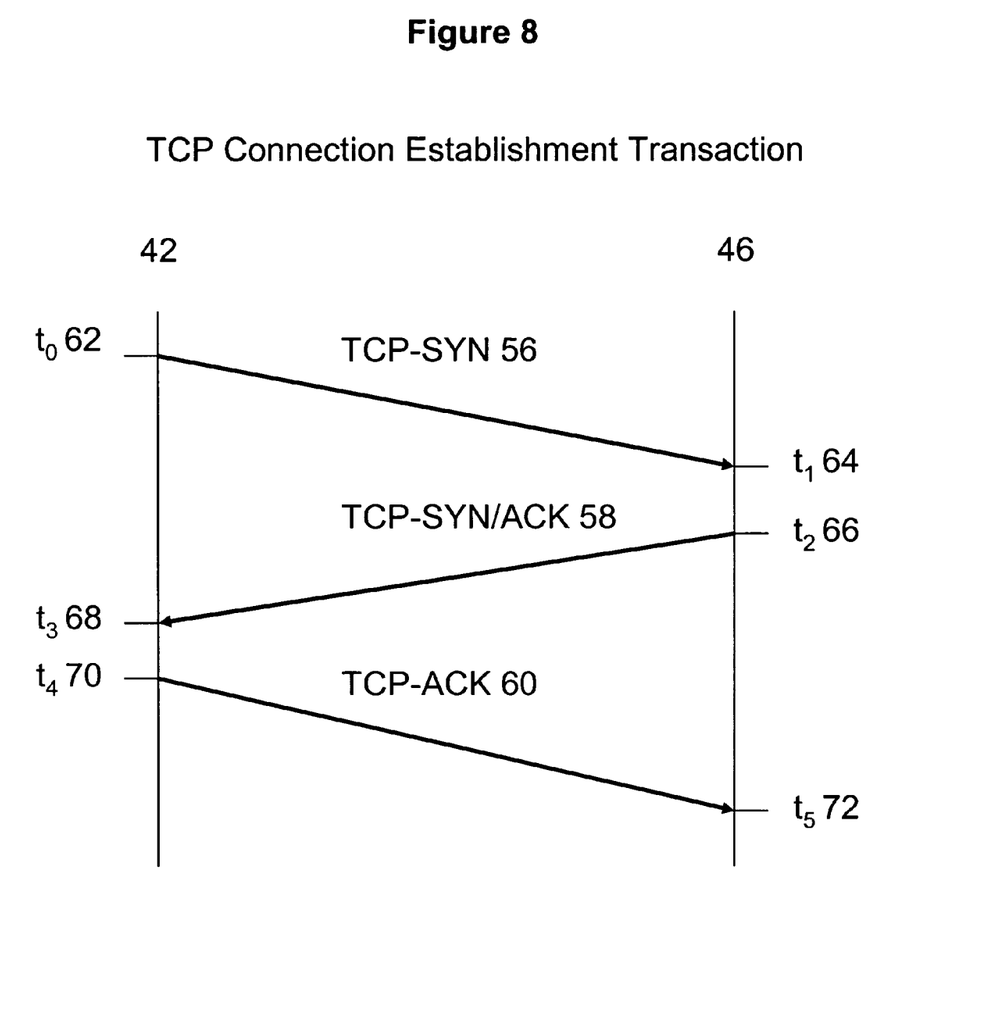
FIG. 8 is an illustration of the TCP/IP connection establishment transaction.

FIG. 8 is an illustration of the TCP/IP connection establishment transaction. A network client 42 sends a TCP Connection Request (TCP-SYN) 56 to a network server 46. The network server 46 receives the TCP-SYN 56 and sends a TCP Connection Request Acknowledgment (TCP-SYN/ACK) 58 back to the network client 42. The network client 42 sends a TCP Connection Establishment Acknowledgment (TCP-ACK) 60 to the network server 46. This completes the TCP connection establishment. The sending and receiving of the TCP-SYN 56 occurs between time $T_0$ 62 and time $T_1$ 64. The sending and receiving of the TCP-SYN/ACK 58 occurs between time $T_2$ 66 and time $T_3$ 68. The sending and receiving of the TCP-ACK 60 occurs between time $T_4$ 70 and $T_5$ 72.

Figure 9:
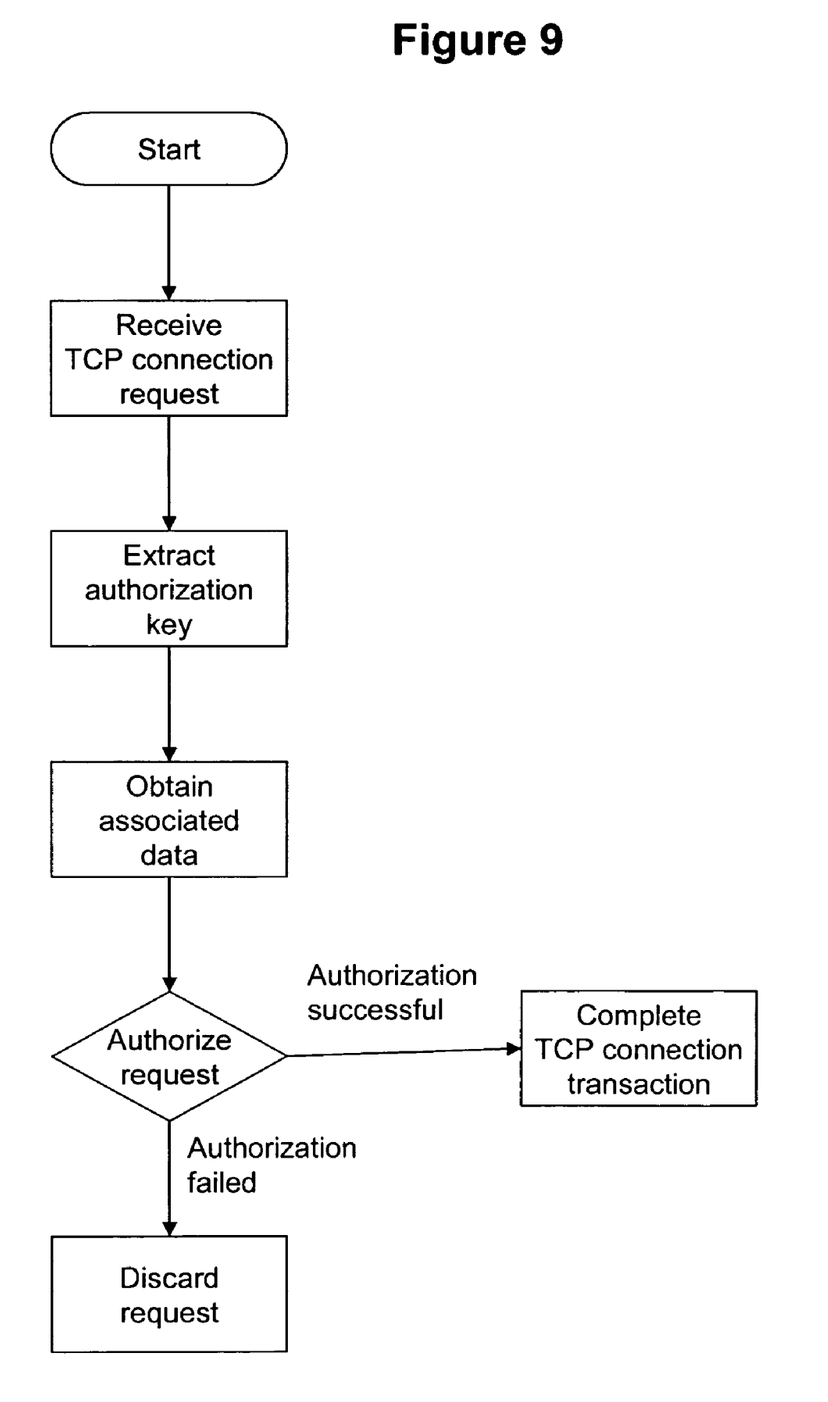
FIG. 9 is a detailed flowchart of a basic embodiment of the invention.

FIG. 9 is a detailed flowchart of a basic embodiment of the invention.

Figure 10:
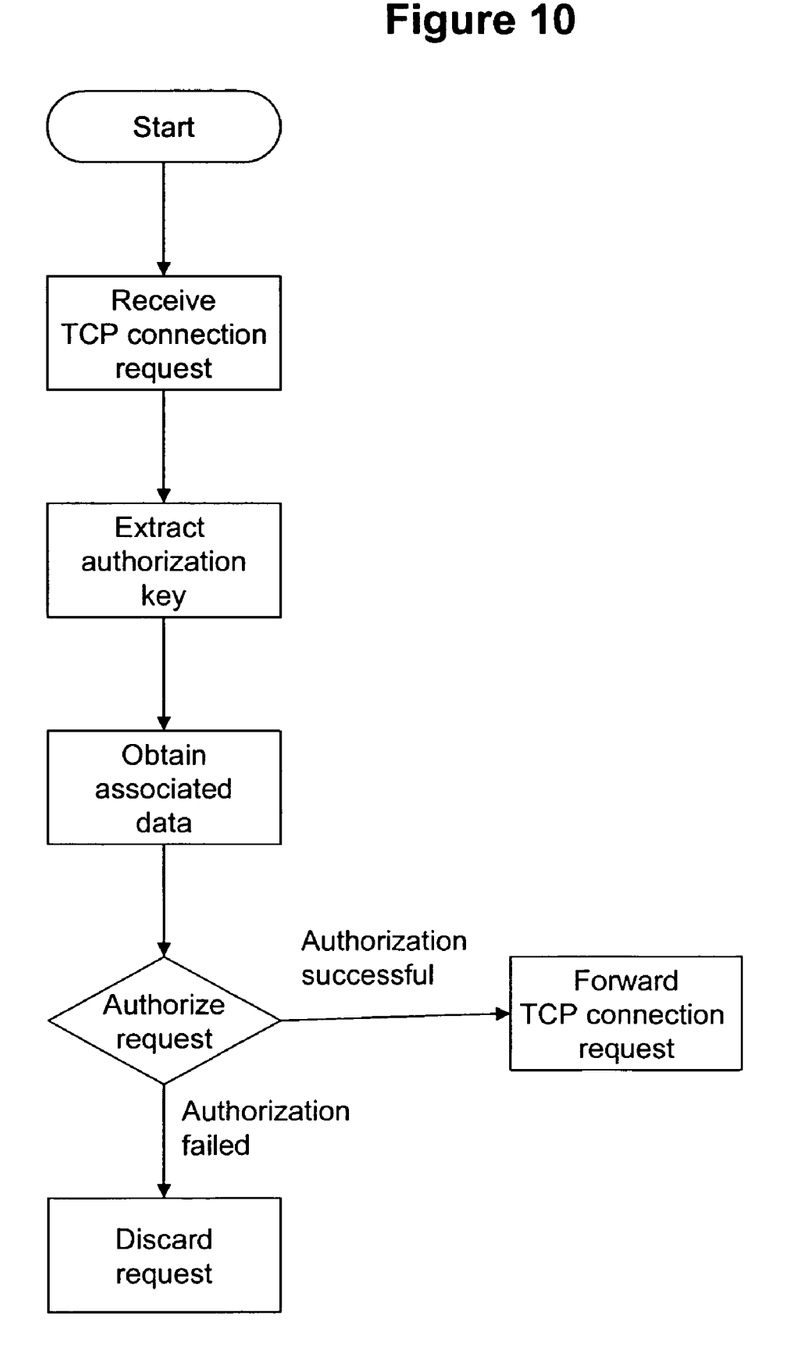
FIG. 10 is a detailed flowchart of an alternate embodiment of the invention.

FIG. 10 is a detailed flowchart of an alternate embodiment of the invention.

In a preferred embodiment, network client 42 is capable of inserting an authentication key 38 into the SEQ field 30 and ACK field 32 of a TCP header 24 on a TCP connection request 56.

In a preferred embodiment, network server 46 is capable of extracting an authorization key 38 from the SEQ field 30 and ACK field 32 of a TCP header 24 on a received TCP connection request 56.

A network client 42 sends a TCP connection request 56 to the network server 46. Contained within the TCP connection request 56 are the sequence number field 30 and the acknowledgment number field 32 in the TCP header 24 which carry an authorization key 38. When the network server 46 receives the TCP connection request 56 from the network client 42, the network server 46 extracts the authorization key 38 and uses the extracted authorization key 38, along with other associated data about the requested connection such as the IP source address 20, the IP destination address 22, the TCP source port 26, the TCP destination port 28, the time 64 the TCP connection request 56 was received and other associated data implicitly and explicitly carried by the TCP connection request 56 to determine the validity of the connection request. In one preferred embodiment, when using a one time key as the authorization key, the received authorization key, along with the received time 64 are the sole criteria used for authorizing the connection. It must be noted that the received time 64 may include the hour, minute, second, date, day of the week, or any other mechanism to determine as distinct or indistinct a time or a range of times as is required.

In another preferred embodiment, a client side intermediate device 44 is capable of inserting an authorization key 38 into the SEQ field 30 and ACK field 32 of a TCP header 24 on a TCP connection request 56 received from network client 52. Network client 52 is unable to insert the authorization key 38. Placing any network client 52 behind a client side intermediate device 44 enables those TCP connection requests 56 originating from any network client 52 to be authorized using this authorization mechanism.

In another preferred embodiment, a server side intervening device 48 is capable of extracting an authorization key 38 from the SEQ field 30 and ACK field 32 of a TCP header 24 on received TCP connection request 56. The network server 54 behind the server side intervening network device 48 is not capable of extracting the authorization key 38. Placing any network server 54 behind the server side intervening network device 48 that has the capability to extract and authorize a TCP connection request 56 enables all connections passing through the server side intervening network device 48 to be authorized without having to perform this authorization on the network server 54.

In an alternate embodiment, the authorization key 38 may be inserted by any network device 44, 48 along the path between the network client 42, 52 and the device 48 or network server 46 performing the authorization.

In an alternate embodiment, the authorization key 38 may be extracted by any network device 44, 48 along the path between the network server 46, 54 and the device 44 or network client 42 performing the insertion of the authorization key 38.

Although this method of concealing a network connected device can be applied to an entire device or server, this method can also be selectively applied only to one or some of the applications performed by the server. This enables some services to be publicly available while hiding others. This also enables servers which appear to perform one application to also perform another, concealed application. Examples of applications that may be suitable for concealment in this way include P2P (peer-to-peer) applications, webserver applications, IM (instant messaging) applications, SMS (short message service) applications, VoIP (Voice over IP) applications, SIP (session instantiation protocol) applications, email applications, spam filter applications, file server applications, FTP server applications, network administration applications, trojan horse applications, virus applications, virus scanner applications, spam generator applications, zombie control applications and other applications that desire concealment for various reasons.

IV. Methods of Operation for Concealing a Network Connected Device

When a TCP connection request 56 is made, the sequence number field 30 within the TCP header 24 specifies the starting sequence number for which subsequent data octets are numbered. This field is 32 bits long. Also within the TCP header 24 is the acknowledgment number field 32. The acknowledgment number field 32 is not used on a TCP connection request 56. The acknowledgment number field 32 is 32 bits long and is adjacent to the SEQ field 30. This gives us 64 bits of data to use as a authorizing key. A smaller key of less than 64 bits may be used if desired. An alternate embodiment increase the size of the authorization key over 64 bits by using the TCP window field 34, the TCP urgent pointer field 36 or other TCP fields 19 that do not effect the TCP connection setup procedure.

The client 42 obtains or generates an authorization key. The client 42 then sends a TCP connection request 56, inserting an authorization key 38 into the SEQ field 30 and ACK field 32, to the desired network connected device 46. The device 46, upon receiving the TCP connection request 56, extracts the received authorization key 38. The receiving device 46 may also use the received IP source address 20, IP destination address 22, the TCP source port 26, the TCP port number 28, the time 64 that the request was received, the physical port the request was received on, or any other information, implicitly or explicitly carried with the TCP connection request 56 to determine the validity of the TCP connection request 56. If the TCP connection request 56, the extracted authorization key 38 and all additional connection granting criteria are met, then the receiving network device 46 authorizes the request and continues the connection establishment transaction by sending a TCP-SYN/ACK 58 to the client 42 in accordance to the TCP protocol specification. This is demonstrated in FIG. 8. If the receiving network device 48 is not the destination device, the network device 48 forwards the TCP connection request 56 towards the destination 54. This is demonstrated in FIG. 9. If the TCP connection request 56, the extracted authorization key 38 and all additional connection authorization criteria are not met, then the receiving network device 46, 48 discards the request 56 and nothing is sent to the requesting client 42. This is demonstrated in both FIG. 8 and FIG. 9. In this way no information is returned to the client 42 without having first been authenticated.

In FIG. 7 a port scanner application on unauthorized network device 50 is attempting to probe network server 46. The unauthorized network device 50 does not have an authorization key 38. The unauthorized network device 50 sends a TCP connection request 56 to network server 46. Although the unauthorized network device 50 did not specifically insert an authorization key 38 into the SEQ field 30 and ACK field 32 of the TCP header 24, these fields 19 are always present. The network server 46 extracts a key from the SEQ field 30 and ACK field 32 of the received TCP connection request 56.

If the network server 46 uses a one time key coupled with the received time as the authorization criteria, there is a 1 in 2^64 chance that a randomly chosen SEQ field 30 and ACK field 32 will match per expiration time of the one time key. The chance of choosing the correct value randomly is 1 in 18,446,744,073,709,551,616 per expiration time of the one time key. Thus it is highly unlikely that a random port scan will produce the correct authorization key.

Because the TCP connection request 56 did not contain a correct key 38, the TCP connection request 56 will be discarded and no response will be returned to the unauthorized network device 50. The unauthorized network device 50, upon receiving no response from the network server 46, will conclude that the server 46 is not there. This demonstrates how a network server 46 can be completely concealed from an unauthorized network device 50.

The novel use of the SEQ field 30 and the ACK field 32 together as a 64 bit authorization key 38 allows a fairly strong authorization while maintaining complete interoperability with known implementations of the TCP protocol.

A network client 42 sends a TCP connection request 56 to the network server 51. Contained within the TCP connection request 56 are the TCP sequence number field 30 and the TCP acknowledgment number field 32 in the TCP header 24 which carry an authorization key 38. When the network server 51 receives the TCP connection request 56 from the network client 42, the network server 51 is unaware of the authorization key 38 embedded within the SEQ field 30 and the ACK field 32. The network server 51 will allow connection establishment to any TCP ports without authorizing them. The network server 51 extracts the value of the SEQ field 30 and uses this value as the initial sequence number as described in the TCP specification and sends a TCP-SYN/ACK 58 to the network client 42 to continue the TCP connection establishment transaction. This demonstrates how the insertion of the authorization key 38 does not affect the operation or interoperability of network devices which are unaware of the presence of the embedded authorization key.

V. Apparatus for Concealing a Network Connected Device

In one preferred embodiment, the insertion of an authorization key into the TCP header is performed in the TCP/IP protocol stack processing software on the network client.

In an alternate preferred embodiment, the insertion of an authorization key into the TCP header is performed by a network protocol accelerator working alone or in conjunction with the protocol stack processing software on the client.

In an alternate preferred embodiment, the insertion of an authorization key into the TCP header is performed by an encryption or authentication accelerator working alone or in conjunction with the protocol stack processing software on the client.

In another preferred embodiment, the authorization key 38 is inserted by an intervening network device 44. This device may be a network firewall, a virtual private network (VPN) device, a router, a switch, a cache, a TCP proxy, a virus scanner, an intrusion detection system, an intrusion prevention system or any other device logically or physically placed between the client 42, 52 and the server 46, 54.

In one preferred embodiment, the extraction and authorization of the authorization key is performed in the TCP/IP protocol stack processing software on the network server.

In an alternate preferred embodiment, the extraction and authorization of the an authorization key is performed by a network protocol accelerator working alone or in conjunction with the protocol stack processing software on the client.

In an alternate preferred embodiment, the extraction and authorization of the authorization key is performed by an encryption or authentication accelerator working alone or in conjunction with the protocol stack processing software on the client.

In another preferred embodiment, the extraction and authorization of the authorization key 38 is performed by an intervening network device 48. This device may be a network firewall, a virtual private network (VPN) device, a router, a switch, a cache, a TCP proxy, a virus scanner, an intrusion detection system, an intrusion prevention system or any other device logically or physically placed between the client 42, 52 and the server 46, 54.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for concealing a network connected device that have been disclosed above are intended to educate the reader about preferred embodiments of the invention, and are not intended to constrain the limits of the invention or the scope of claims. The List of Reference Characters which follows is intended to provide the reader with a convenient means of identifying elements of the invention in the Specification and Drawings. This list is not intended to delineate or narrow the scope of the claims.

LIST OF REFERENCE CHARACTERS

10 Room containing artwork and concealed safe
12 Artwork
14 Safe
16 Contents of safe
18 IP header
19 field
20 IP source address field
22 IP destination address field
24 TCP header
26 TCP source port field
28 TCP destination port field
30 TCP sequence number field
32 TCP acknowledgment number field
34 TCP window field
36 TCP urgent pointer field
37 Authorization key formed by some fields extracted from the TCP header
38 Authorization key formed by the TCP sequence number field and the TCP acknowledgment number field
39 TCP/IP packet
40 Network
42 Client connected to network
44 Client side intermediate device
46 Server connected to network that can perform authorization
48 Server side intermediate device
50 Unauthorized device connected to network
51 Server that does not perform authorization
52 Client connected to network through a client side intermediate device
54 Server connected to network through a server side intermediate device
56 TCP Connection Request (TCP-SYN)
58 TCP Connection Request Acknowledgment (TCP-SYN/ACK)
60 TCP Connection Establishment Acknowledgment (TCP-ACK)
62 Time TCP Connection Request is sent ($T_0$)
64 Time TCP Connection Request is received ($T_1$)
66 Time TCP Connection Request Acknowledgment is sent ($T_2$)
68 Time TCP Connection Request Acknowledgment is received ($T_3$)
70 Time TCP Connection Establishment Acknowledgment is sent ($T_4$)
72 Time TCP Connection Establishment Acknowledgment is received ($T_5$)

What is claimed is:

1. A method comprising the steps of:
creating an authorization key (37) at a first network connected device;
inserting said authorization key (37) into a TCP header (24) of a TCP SYN (56);
sending a packet (39) including said TCP SYN (56) to a second network connected device (46);
receiving said packet (39) at said second network connected device (46);
said packet (39) including a TCP header (24) containing a TCP connection request SYN (56);
said packet (39) including an IP header (18) and a TCP header (24);
said IP header (18) and said TCP header (24) including a field (19);
said inserted authorization key (37) being extracted from said field (19);
said TCP header (24) including a SEQ field (30) and an ACK field (32);
said inserted authorization key (38) being extracted from said SEQ field (30) and said ACK field (32);
extracting said previously inserted authorization key (37) from said TCP header (24);
authorizing said TCP connection request SYN (56);
using said inserted authorization key (37) and associated data;
determining if said authorization is successful; and
responding to said TCP connection request SYN (56) based on said determination of authorization success.

2. A method as recited in claim 1, in which:
said associated data includes a received IP source address (20).

3. A method as recited in claim 1, in which:
said associated data includes a received IP destination address (22).

4. A method as recited in claim 1, in which:
said associated data includes a received TCP source port (26).

5. A method as recited in claim 1, in which:
said associated data includes a received TCP destination port (28).

6. A method as recited in claim 1, in which:
said associated data includes a time (64) when said TCP connection request SYN (56) was received.

7. A method as recited in claim 1, in which:
said associated data includes a physical port upon which said TCP connection request SYN (56) was received.

8. A method as recited in claim 1, in which:
said authorization is performed by a receiving server (46).

9. A method as recited in claim 1, in which:
said authorization is performed by an intervening network device (48).

10. A method as recited in claim 1, further comprising the additional steps of:
determining that said authorization has failed; and
discarding said TCP connection request SYN (56).

11. A method as recited in claim 1, further comprising the additional steps of:
determining that said authorization has succeeded; and
sending a TCP-SYN/ACK (58) to the sender of said TCP connection request SYN (56).

12. A method as recited in claim 1, further comprising the additional steps of:
  determining that said authorization has succeeded; and
  forwarding said TCP connection request SYN (56) towards a destination.
13. A method as recited in claim 1, in which:
  the extraction of said inserted authorization key (37) from said TCP header (24) does not affect the customary function of said TCP header (24).
14. A method as recited in claim 1, in which:
  the extraction of said inserted authorization key (37) from said TCP header (24) does not require any optional fields (19) in said TCP (24) header.
15. A method as recited in claim 1, in which:
  the extraction of said inserted authorization key (37) from said TCP header (24) does not require any modification of said TCP (24) header.
16. A method as recited in claim 1, in which:
  said authorization key (37) is inserted into said plurality of fields (19) normally present in the TCP header (24).
17. A method as recited in claim 1, in which:
  said authorization key (37) is inserted into a SEQ field (30) and an ACK field (32) of said TCP header (24).
18. A method as recited in claim 1, in which:
  said authorization key (37) is inserted by a network device performing (42) said TCP SYN (56).
19. A method as recited in claim 1, in which:
  said authorization key (37) is inserted by an intervening network device (44).
20. A method as recited in claim 1, in which:
  the insertion of said authorization key (37) into said TCP (24) header does not affect the customary functions of said TCP header (24).
21. A method as recited in claim 1, in which:
  the insertion of said authorization key (37) into said TCP header (24) does not require any optional fields (19) in said TCP (24) header.
22. A method as recited in claim 1, in which:
  the insertion of said authorization key (37) into said TCP header (24) does not require any modification of said TCP (24) header.
23. A method comprising the steps of:
  creating an authorization key (37) at a first network connected device;
  inserting said authorization key (37) into a TCP header (24) of a TCP SYN (56);
  sending a packet (39) including said TCP SYN (56) to a second network connected device;
  receiving said TCP SYN (56) at a second network connected device (46);
  requiring authorization of said TCP SYN (56); and
  said authorization utilizing an inserted authorization key (37) extracted from said TCP SYN (56).
24. A method as recited in claim 23, in which:
  the chance of guessing said inserted authorization key (37) is reduced from the present level which has no authorization key.
25. A method as recited in claim 23 in which:
  said second network connected device (46) remains concealed in the presence of said unauthorized TCP SYN (56).

* * * * *